US009607596B2

United States Patent
Sood et al.

(10) Patent No.: US 9,607,596 B2
(45) Date of Patent: Mar. 28, 2017

(54) PRESSURE TRANSDUCER (71) Applicant: Viatran Corporation, Wheatfield, NY (US)

(72) Inventors: Surinder Sood, West Seneca, NY (US); Matthew D. Miles, Franklin, MA (US); John R. Biagioni, Whitinsville, MA (US); Joel D. Neri, Youngstown, NY (US)

(73) Assignee: Viatran Corporation, Wheatfield, NY (US)

( * ) Notice: Subject to any disclaimer, the term of this patent is extended or adjusted under 35 U.S.C. 154(b) by 728 days.

(21) Appl. No.: 13/970,789

(22) Filed: Aug. 20, 2013

(65) Prior Publication Data

US 2014/0328143 A1 Nov. 6, 2014

Related U.S. Application Data (60) Provisional application No. 61/819,796, filed on May 6, 2013.

(51) Int. Cl.
G01V 1/16 (2006.01)
G10K 11/00 (2006.01)
(Continued)

(52) U.S. Cl.
CPC .......... *G10K 11/004* (2013.01); *G01L 19/003* (2013.01); *G01L 19/0038* (2013.01); *G01L 19/144* (2013.01)

(58) Field of Classification Search
CPC . G01L 9/0073; G01L 19/0645; G01L 19/143; H01L 2924/00014
(Continued)

(56) References Cited

U.S. PATENT DOCUMENTS 4,297,891 A 11/1981 Falcon
D270,819 S 10/1983 Simons
(Continued)

FOREIGN PATENT DOCUMENTS

CN 101881674 A 11/2010
EP 0488446 A1 6/1992
(Continued)

OTHER PUBLICATIONS

[No Author Listed] Hammer Unions. SPM Flow Control, Inc. 1999. 6 pages.

(Continued)

*Primary Examiner* — Mark Hellner
(74) *Attorney, Agent, or Firm* — Wolf, Greenfield & Sacks, P.C.

(57) ABSTRACT

The hammer union pressure transducer engages with a cinch nut of a hammer union coupling to cinch a nose end toward an internal sealing surface of a male component of the hammer union coupling. The transducer includes a connection end removably threaded to the nose end. An anti-rotation device engages the connection end and the nose end, inhibiting inadvertent unthreading. The anti-rotation device is removable or shearable, allowing unthreading of the connection end from the nose end as desired. A recess may be formed on the external sealing surface of the nose end and an insert may be disposed in the recess. The insert, if used, may be formed of a material that is different from a material of the nose end. An upgrade kit may also be employed and includes an adapter plate to connect to the nose end.

43 Claims, 11 Drawing Sheets (51) Int. Cl.
*G01L 19/00* (2006.01)
*G01L 19/14* (2006.01)

(58) Field of Classification Search
USPC .......................................................... 367/188
See application file for complete search history.

(56) References Cited

U.S. PATENT DOCUMENTS

| | | | |
|---|---|---|---|
| 4,970,898 | A | 11/1990 | Walish et al. |
| 5,535,629 | A | 7/1996 | Gerdes et al. |
| 5,665,920 | A | 9/1997 | Martin |
| 6,311,561 | B1 | 11/2001 | Bang et al. |
| D470,428 | S | 2/2003 | Kryskowski et al. |
| 6,764,109 | B2 | 7/2004 | Richardson et al. |
| D588,483 | S | 3/2009 | Chu |
| 7,647,833 | B1 | 1/2010 | Oboodi et al. |
| D695,140 | S | 12/2013 | Ashino |
| D711,266 | S | 8/2014 | Miles et al. |
| D757,582 | S | 5/2016 | Miles et al. |
| 2005/0072242 | A1 | 4/2005 | Fandrey |
| 2010/0170585 | A1* | 7/2010 | Nimberger ............ F16K 5/0605 137/614 |
| 2010/0282001 | A1 | 11/2010 | Sasaki |
| 2011/0175349 | A1* | 7/2011 | Dallas .................... F16L 17/08 285/354 |
| 2012/0279309 | A1 | 11/2012 | Richards et al. |
| 2013/0134343 | A1* | 5/2013 | Nimberger ............ F16K 5/0605 251/315.1 |
| 2014/0060689 | A1* | 3/2014 | Zeyfang .............. F16L 55/1108 138/89 |

FOREIGN PATENT DOCUMENTS

| | | | |
|---|---|---|---|
| EP | 0723143 | A1 | 7/1996 |
| EP | 2522973 | A1 | 11/2012 |
| EP | 14166964.8 | | 11/2014 |

OTHER PUBLICATIONS

APG, Intrinsically Safe Hammer Union Pressure Transmitter, p. 1-3, Automation Products Group, Inc., North Logan, UT.
Dynisco Model PT390 Oil Field Pressure Transmitter, Dynisco, p. 217-219.
General Electric Co., PTX 661 Druck Hammer Union Pressure Transmitter, 2006, General Electric Company.
General Electric Co., PTX 661 Druck Hammer Union Pressure Transmitter, 2008, General Electric Company.
GP:50 Weco® "Hammer" Union Pressure Transmitter Models 170, 270, 370, GP:50, Grand Island, NY.
Honeywell, Model 424 Wing Union/Hammer Union Pressure Sensors, Nov. 2012, p. 1-5, Honeywell International Inc., Golden Valley, MN.
Honeywell, Model 425 Wing Union/Hammer Union Pressure Sensors, Nov. 2012, p. 1-5, Honeywell International Inc., Golden Valley, MN.
Honeywell, Model 427, Wing Union/Hammer Union Free Flow Pressure Sensors, Nov. 2012, p. 1-5, Honeywell International Inc, Golden Valley, MN.
Scan-Sense, Wing Union Pressure Transmitter Model 5WU1 502-20 & 5WU2202-20, ver. 3.0-2006, p. 1-4, Scan-Sense AS, Vear, Norway.
Stellar Technology, Hammer Union WECO® 1502, 2 inch Pressure Transmitter, Stellar Technology Incorporated, Amherst, NY.
Stellar Technology, Hammer Union WECO® 2202, 2 inch Pressure Transmitter, Stellar Technology Incorporated, Amherst, NY.
Stellar Technology, Series GT2450, 4-20 mA Hazardous Location Pressure Transmitter, 2003, Stellar Technology Incorporated, Amherst, NY.
Stellar Technology, Series GT2250, 4-20 mA Hazardous Location Pressure Transmitter, 2004, Stellar Technology Incorporated, Amherst, NY.
Viatran, Pressure Transmitter Models 509 / 709 / 809, Jun. 2010, Viatran, Wheatfield, NY.
Viatran, Pressure Transmitter Models 510 / 520, Viatran, Wheatfield, NY.
Vishay Precision Group, Pressure Transmitters, Mar. 18, 2010, disclaimer published Apr. 27, 2011, Vishay Precision Group.
U.S. Appl. No. 29/454,010, filed May 6, 2013, Miles et al.
Partial European Search Report dated Nov. 21, 2014 for European Application No. 14166964.8.
Viatran Hotline: "A Dynisco Company" Nov. 12, 2011. Retrieved from the Internet on Nov. 13, 2014. 3 pages.
Extended European Search Report dated Feb. 19, 2015 for EP Application No. 14166964.8.
Hammer Union Pressure Transmitters. Dec. 31, 1999. Retrieved from the Internet: Feb. 11, 2015. 2 pages.
Chinese Office Action and English summary thereof issued Oct. 10, 2015 for corresponding Chinese Application No. 201410185106.3.
Chinese Office Action and English summary thereof issued Jun. 30, 2016 for corresponding Chinese Application No. 201410185106.3.
Chinese Office Action dated Jan. 6, 2017 and English translation thereof in connection with Chinese Application No. 201410185106.3.

* cited by examiner

PRESSURE TRANSDUCER

RELATED APPLICATIONS

This application claims the benefit under 35 U.S.C. §119 (e) of U.S. Provisional Application Ser. No. 61/819,796, entitled "PRESSURE TRANSDUCER" filed on May 6, 2013, the entire contents of which is incorporated herein by reference.

BACKGROUND

1. Field

Aspects relate generally to pressure transducers and more particularly to hammer union pressure transducers.

2. Discussion of Related Art

A well-known quick connect between pipes and the like is known as a union and comprises a male thread on a male component that cooperates with a female thread on a collar to provide a quick connect/disconnect coupling. A more specialized quick connect/disconnect coupling is known as a hammer union, shown in FIG. 1. The hammer union coupling 10 includes a male component 12 with threads 14 on the exterior surface, an internal sealing surface 16, and a coupling component 18 having a smooth nose 20 abutting the sealing surface 16. An additional seal 22 between the male component 12 and the coupling component 18 may or may not be employed. A hammer nut 24 having female threads 26 on the interior surface is threaded to the male threads 14. Ears 28 are formed on the exterior surface of the nut 24. The hammer nut 24 includes a ledge 30 that engages shoulders 32 formed on the coupling end to cinch the coupling end to the male end as the nut is tightened. Hammer unions take their name from the fact that ears on the hammer nut may be struck with a hammer to cinch up the coupling.

Figure 1:
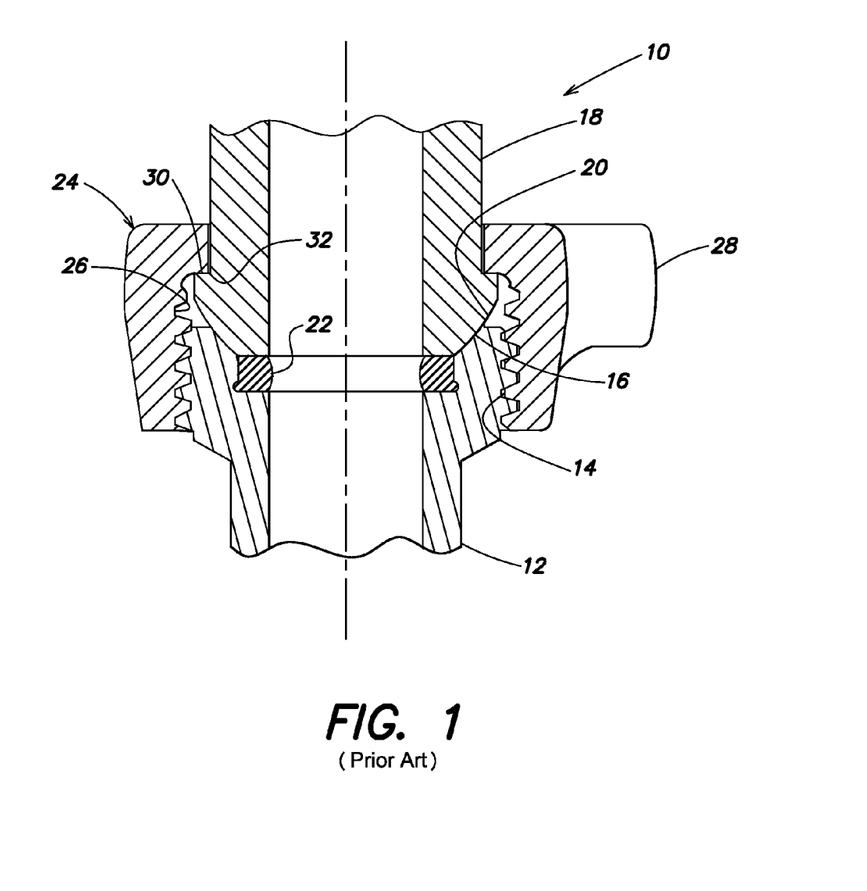
FIG. 1 is a cross-sectional view of a prior art hammer union coupling.

Hammer union pressure transducers have been developed to sense the pressure within the pipe. Typical hammer union pressure transducers replace the coupling component 18 of the hammer union and couple directly with the male component 12 via the nut 24. The transducers include the same or similar smooth nose to abut the internal sealing surface of the male component. As in hammer union couplings, the hammer nut engages with a shoulder formed on the pressure transducer to cinch the pressure transducer to the male component as the hammer nut is tightened. Exemplary hammer union pressure transducers include Viatran® Models 509, 510 and 520 available from the assignee of the present application (Viatran®, a Dynisco® Company, 3829 Forest Parkway, Suite 500, Wheatfield, N.Y. 14120, USA).

SUMMARY

In one illustrative embodiment, a hammer union pressure transducer is provided. The hammer union pressure transducer includes a housing having a nose end with a surface adapted to engage an internal sealing surface of a male component of a hammer union coupling. A separate connection end is removably threaded to the nose end along a mounting thread axis. A shoulder is formed on the housing and is adapted to be engaged by a cinch nut of the hammer union coupling to cinch the housing toward the male component such that the sealing surface of the nose end sealingly engages the internal sealing surface of the male component. An anti-rotation device engages the connection end and the nose end to inhibit inadvertent unthreading of the connection end from the nose end. The anti-rotation device is constructed and is arranged in the housing to be at least one of removable and shearable thereby allowing unthreading of the connection end from the nose end. A pressure sensor disposed in the nose end.

In another illustrative embodiment, an upgrade kit for a hammer union pressure transducer is provided. The kit includes an adapter plate adapted to connect to a nose end of the hammer union pressure transducer. The nose end has a surface adapted to engage an internal sealing surface of a male component of a hammer union coupling. The nose end has a shoulder adapted to be engaged by a cinch nut of the hammer union coupling to cinch the housing toward the male component such that the sealing surface of the nose end sealingly engages the internal sealing surface of the male component. A pressure sensor is disposed in the nose end. A connection end is removably threaded to the adapter plate along a mounting thread axis.

In yet another illustrative embodiment, a hammer union pressure transducer is provided. The hammer union pressure transducer is adapted to be engaged by a cinch nut of a hammer union coupling to cinch the hammer union pressure transducer toward a male component of the hammer union coupling. The hammer union pressure transducer includes a nose end having a body and a pressure sensor disposed in the body. An external sealing surface of the nose end is adapted to engage an internal sealing surface of the male component of a hammer union coupling. An insert recess is formed the external sealing surface. An insert disposed in the insert recess. The insert is formed of a material that is different from a material of the body. A separate connection end is removably threaded to the nose end along a mounting thread axis.

Other advantages and novel features of the invention will become apparent from the following detailed description of various non-limiting embodiments when considered in conjunction with the accompanying figures and claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments will now be described, by way of example, with reference to the accompanying drawings, in which.

DETAILED DESCRIPTION

Conventional hammer union pressure transducers are often employed in harsh conditions such as harsh drilling environments found in the fracking industry. The inventors have found that conventional hammer union pressure transducers degrade prematurely largely because the electric connections to the pressure sensor deteriorate over time. Further, the inventors have found that the hammer union pressure transducers are often manufactured in ways that hinder repair, such as including multiple components welded together. However, such a welded connection prevents disassembly ease necessary for repair.

Figure 2:
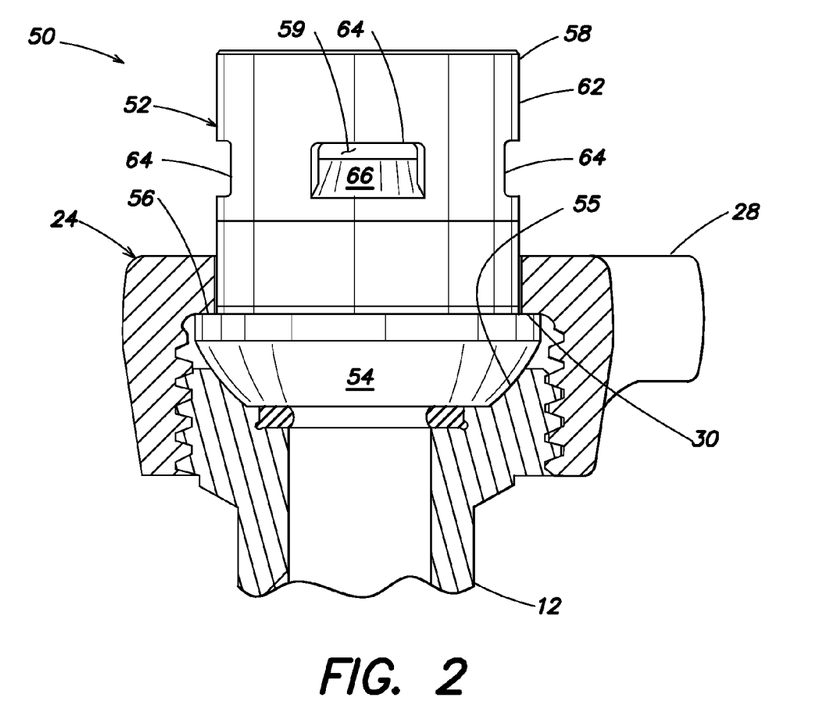
FIG. 2 is a partial cross-sectional view of a hammer union pressure transducer according to one aspect shown with a hammer union male component and locking nut shown in cross-section.

A hammer union pressure transducer 50 according to one aspect is shown in FIG. 2. The hammer union pressure transducer 50 includes a housing 52 having a nose end 54 adapted to cooperate in a sealing fashion with the male component 12 of the hammer union coupling. As noted above with a hammer union coupling, an additional seal or seals (not shown) may be included between the male component and the hammer union pressure transducer. The hammer nut 24 includes a ledge 30 that engages a shoulder 56 formed on the housing 52. The shoulder may be formed on any portion of the housing and in one embodiment is formed on the nose end 54. As the nut 24 is tightened, ledge 30 engages shoulder 56 to draw the nose end 54 (e.g., an external sealing surface 55 of the nose end) into sealing relation with the male component 12 (e.g., an internal sealing surface 57 of the male component).

Figure 3:
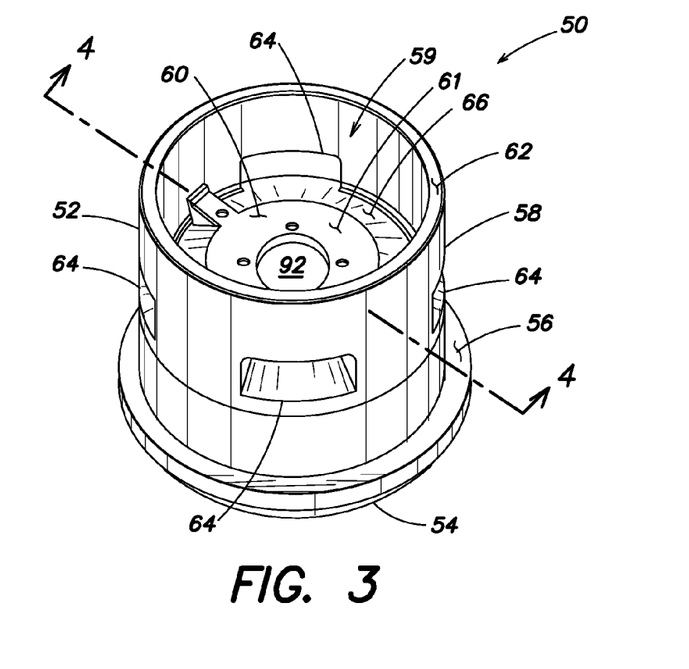
FIG. 3 is a perspective view of the hammer union pressure transducer shown in FIG. 2.

Housing 52 includes a connection end 58 opposite the nose end. The connection end 58 houses the electrical connection (not shown) to the pressure sensor (not shown) disposed within the housing 52. As shown in FIGS. 2 and 3, the housing 52 is formed with a recessed cavity 59 formed with an electrical connection mounting area or surface 60 to receive the electrical connection. In this manner, the electrical connection is set in the housing and is protected from errant tool impacts by a thick side wall 62. Unfortunately, this type of arrangement creates a pocket in which water, mud and sludge can collect around the electrical connector, which may cause it to degrade and penetrate into the body of the transducer. While the connection is hermetically sealed to withstand rain, water, mud and sludge, for example, the inventors have found that it would be desirable to allow such debris to drain away from the connection.

According to one aspect, the side wall 62 includes one or more drainage opening(s) 64 extending from the recessed cavity 59 to the outside of side wall 62. This allows debris such as water, mud, and sludge to flow out of the recessed cavity 59 and away from the connection. The openings are sized large enough to facilitate such drainage, reducing the likelihood that debris will become lodged in the opening and block flow.

To further facilitate such drainage, the bottom of the recess upon is sloped toward the drainage holes. This sloped surface 66 forms a flow path away from the connector toward the drainage openings 64 to reduce the accumulation of debris and moisture around the connector.

According to one embodiment, the sloped surface is a flat conical surface that extends from the drainage holes toward a raised flat surface 61 of the electrical connection mounting area 60 to which at least a portion of the electrical connection is mounted. However, the present disclosure is not limited in this regard and other suitable sloped surfaces, such as a convex shape or concave shape, may be employed. Further, though the drainage holes are shown as generally rectangular with a length equal to about twice the height of the opening, other suitable shapes, such as round, oval, triangular, square, crescent, etc. may be used. The figures show four equally spaced drainage holes extending around the periphery of the housing. More or less drainage openings (and with or without equal spacing) may be employed, as the present disclosure is not so limited.

Figure 4:
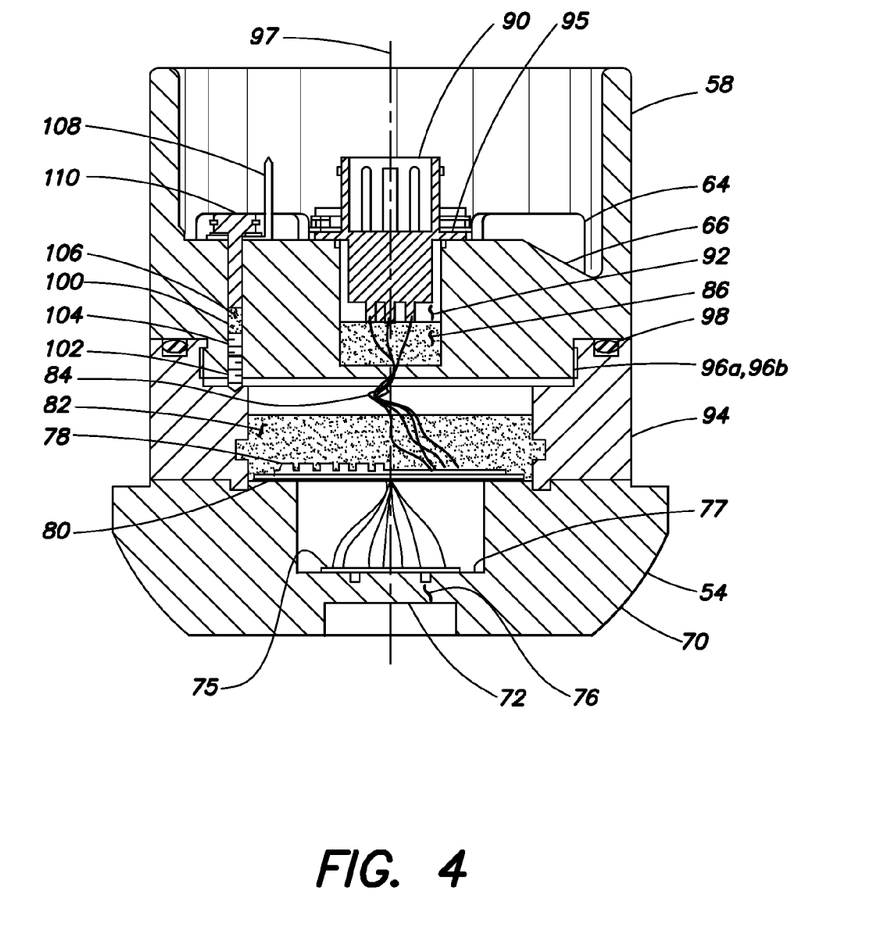
FIG. 4 is a cross-sectional view of the hammer union pressure transducer taken along lines 4-4 of FIG. 3.

Turning now to FIG. 4, a cross section of the hammer union pressure transducer 50 is shown. The transducer 50 includes a pressure sensing end 70 on the nose end 54 and opposite the connection end 58. The pressure sensing end 70 is formed with a recess 72 exposed to the fluid pressure when in use. A cavity 74 disposed in the pressure sensing end 70 receives a pressure sensor, which may include a strain gage 75, mounted to the surface 76. The material of the pressure sensing end 70 between the strain gage 75 and the recess 72 forms a pressure diaphragm 76, such that as the pressure in the fluid increases, the diaphragm deflects producing a strain on the strain gage. Strain gage wire is bonded to the strain gage and is connected to a printed circuit board 78. Voltage signals from the stain gage are thus transmitted to the printed circuit board, as is well known. The printed circuit board may be mounted via 2-sided mounting tape 80, though other suitable mounting arrangements may be employed, such as screws, rivets, adhesive, etc. as the present disclosure is not limited in this regard. Potting material 82 may be disposed over and/or around the printed circuit board. Wire leads 84 from the printed circuit board may extend to the electrical connection. As shown, the electrical connection 90 extends into a hole or recess 92 formed in the housing. Potting material 86 may also be used to secure the wire leads 84. The electrical connection 90 may be mounted in any suitable manner as the present disclosure is not limited in this regard. In one embodiment, the electrical connection 90 includes flanges 94 that receives screws (not shown) to secure the electrical connection 90 to the mounting surface 61.

It should be appreciated that the hammer union pressure transducer may include any suitable sensing electronics including the strain gage or other pressure responsive device, the printed circuit board, suitable wire leads and potting material and the electrical connector, as the present disclosure is not so limited.

According to one aspect, the hammer union pressure transducer may be formed such that it may be easily and readily assembled, and/or upgraded and repaired as necessary. As shown in FIG. 4, in one embodiment, the housing 52 is formed with multiple components joined together. In this example, the nose end 54 includes pressure sensing end 70 coupled to an adapter ring 94. The adapter ring may be joined to the sensing end by any suitable arrangement. In one embodiment, the adapter ring is welded to the sensing end.

The adapter ring is formed with female threads 96a to couple with male threads 96b of the connection end 58 along a mounting thread axis 97. Of course, the adapter ring 94 may be formed with male threads and the connection end 58 may be formed with female threads. A thread locking adhesive may be applied to the threads 96a, 96b to aid in restricting disassembly. An o-ring seal 98 is sandwiched between the connection end and the nose end (e.g., in this embodiment, the adapter ring), though other suitable seals (or no seal at all) may be employed.

In one embodiment, the sensing end is formed of a nickel-chromium alloy, such as Inconel® or 718 Inconel®, available from Special Metals Corporation, Huntington, W. Va., USA. In one embodiment, the adapter ring is formed of stainless steel such as 304 stainless steel. In one embodiment, the connection end 58 is also formed of stainless steel such as 304 stainless steel.

The connection end 58 and the adapter ring 94 may employ an arrangement to further prevent the two components from unthreading, yet allow for disassembly as necessary. In one embodiment, this anti-rotation lockup is hidden from view, thus effectively preventing inadvertent disassembly or tampering by untrained personnel.

As shown in FIG. 4, connection end 58 includes a threaded hole arranged parallel to the mounting thread axis for a screw lockup arrangement. However, it should be appreciated that the threaded hole may be disposed at an angle relative to the mounting thread axis, such as perpendicular, as the current disclosure is not limited in this respect. In one embodiment, after the adapter ring 94 is threaded to the connection end 58, a first set screw 102, such as a chisel point set screw, is threaded in the threaded hole 100 of the connection end 58 where the set screw (e.g., the chisel point) penetrates into or indents the mating surface of the adapter ring. In one embodiment, to aid in the penetration/indentation of the set screw, an indentation tool is first inserted into the threaded bore and pressed to form an indent in the mating surface. After the first set screw is tightened down against the adapter ring, in order to provide additional security against the set screw from backing out, a second set screw 104 is threaded into the hole and tightened against the first set screw, thus effectively locking it in place. This arrangement prevents the locking set screw from backing out, thus preventing unthreading of the adapter ring and the connection end. In one embodiment, a sealant 106, such as silicone sealant, is placed behind the second set screw.

The entire set screw locking arrangement may be hidden from view inside the connection end 58 to prevent unwanted access. In a further embodiment, a ground lug 108 is mounted to the connection end. To further limit access to the set screw(s) and/or instead of creating an additional mounting location, the grounding lug 108 may be attached with a grounding lug mounting screw 110 that threads into the threaded bore 100. In this embodiment, the second set screw 104 need not be employed and the mounting screw 110 may act to lock the first set screw 102. Of course the present invention is not limited in this regard and no additional mounting screw need be inserted into the threaded bore and the grounding lug, if used, may be attached via some other mounting arrangement.

Figure 5:
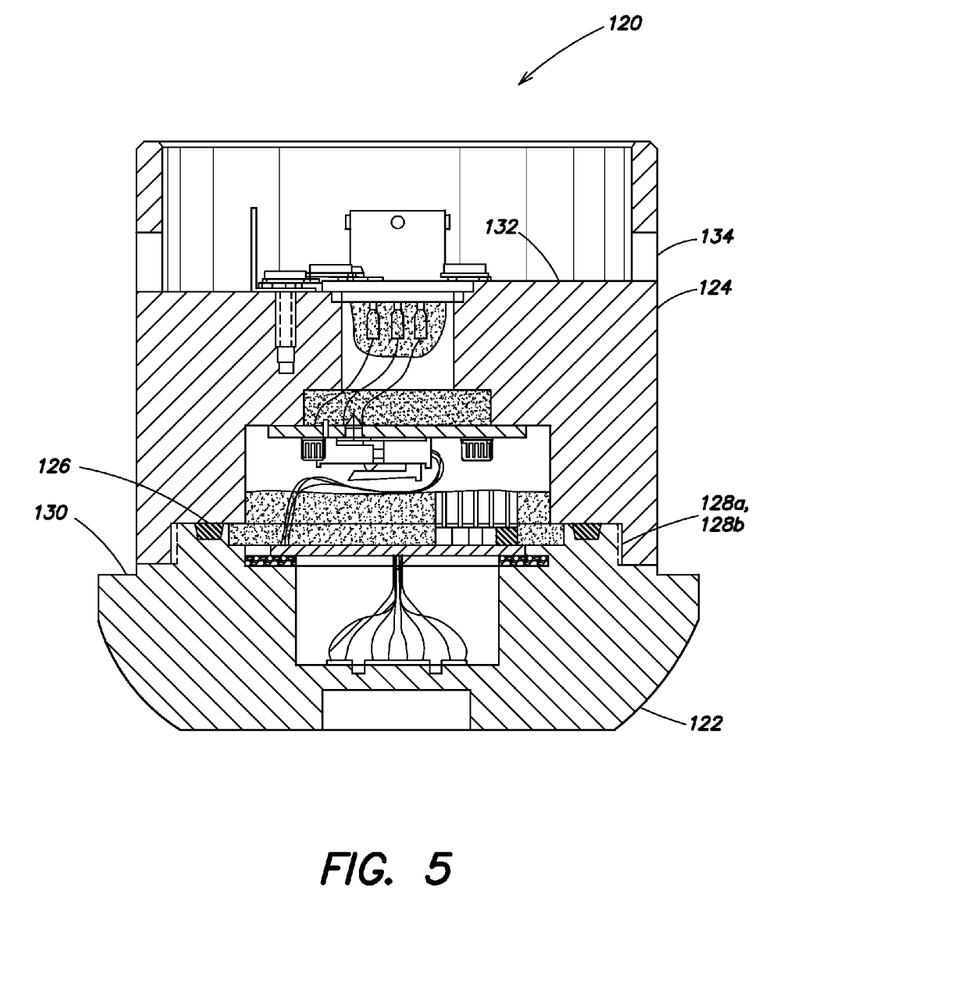
FIG. 5 is a cross-sectional view of another embodiment of a hammer union pressure transducer.

In one embodiment, as shown in FIG. 5, a hammer union pressure transducer 120 is formed with a nose end 122 coupled directly to the connecting end 124. A seal 126 may be provided therebetween. In this embodiment, as with the embodiment described above with reference in particular to FIG. 4, the nose end 122 is formed with male threads 128*a* and the connecting end is formed with female threads 128*b*, though the nose end may be formed with female threads and the connecting end may be formed with male threads, as the present disclosure is not limited in this regard. A thread locking adhesive may be applied to the threads 128*a*, 128*b* to aid in restricting disassembly. In this embodiment, to further prevent disassembly, the nose end and the connecting end are subsequently welded together at weld line 130. It should be understood that though the connecting end is formed with a flat surface 132 and debris egress holes 134, the mounting area may be elevated and a conical surface may be provided as described above in order to minimize accumulation of debris. Also, it should be appreciated that the pressure sensor and related electronics, though shown differently than that of FIG. 4, any suitable arrangement may be used, as the present disclosure is not limited in this regard.

Figure 6:
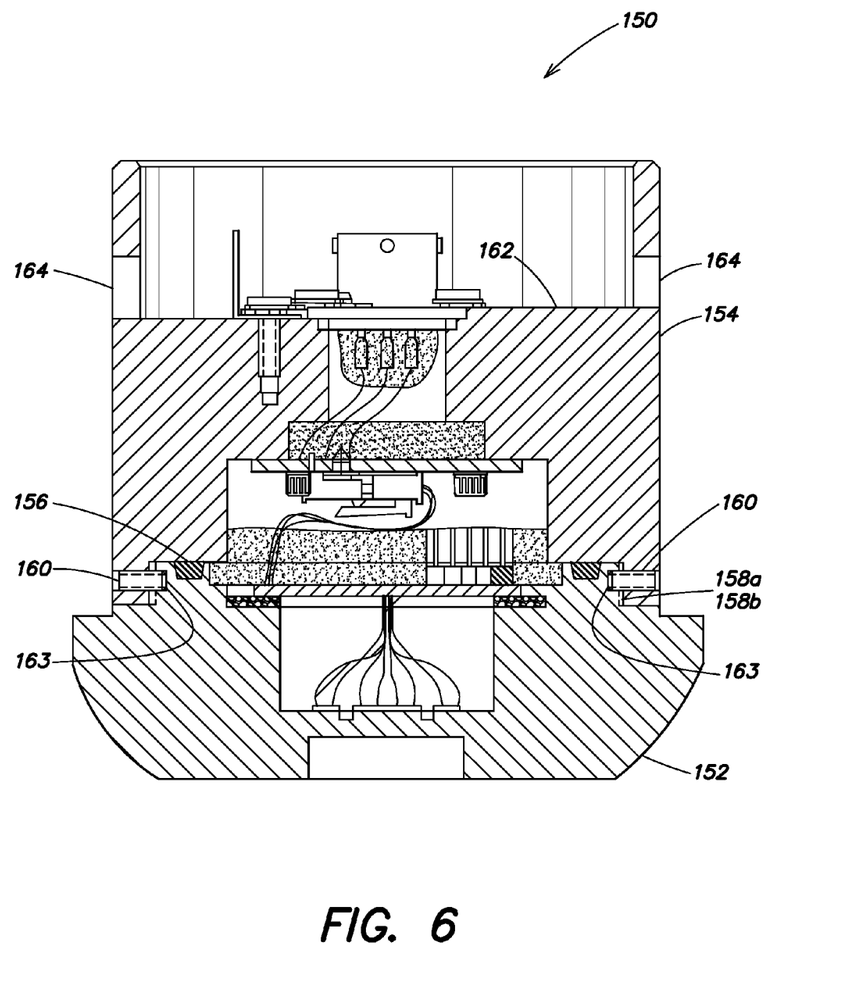
FIG. 6 is a cross-sectional view of another embodiment of a hammer union pressure transducer.

In one embodiment, as shown in FIG. 6, a hammer union pressure transducer 150 is formed with the nose end 152 coupled directly to the connecting end 154. A seal 156 may be provided therebetween. In this embodiment, as with the embodiment described above with reference in particular to FIG. 4, the nose end 152 is formed with male threads 158*a* and the connecting end is formed with female threads 158*b*, though the nose end may be formed with female threads and the connecting end may be formed with male threads, as the present disclosure is not limited in this regard. A thread locking adhesive may be applied to the threads 158*a*, 158*b* to aid in inhibiting disassembly. In this embodiment, to further prevent disassembly, one or more set screws 160 are threaded into the connecting end 154 and engage a recess 162 formed in the nose end 152. Rather than set screws, shear pins may be provided such that, in order to unthread the connecting end and the nose end, the pins must be sheared. The pins may be formed of nylon. It should be understood that though the connecting end is formed with a flat surface 162 and debris egress holes 164, the mounting area may be elevated and a conical surface may be provided as described above in order to minimize accumulation of debris. Also, it should be appreciated that the pressure sensor and related electronics, though shown differently than that of FIG. 4, any suitable arrangement may be used, as the present disclosure is not limited in this regard.

Figure 7:
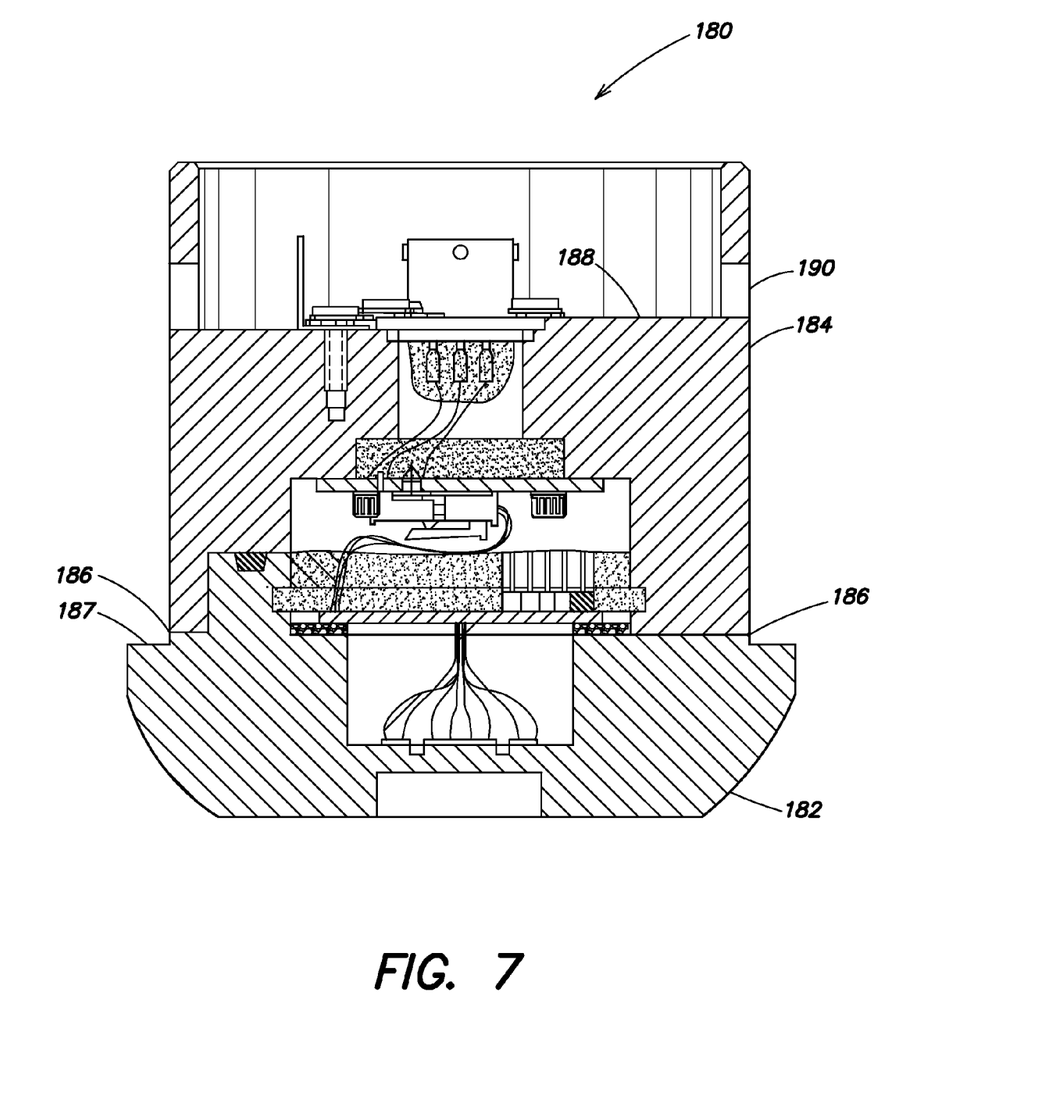
FIG. 7 is a cross-sectional view of another embodiment of a hammer union pressure transducer.

In one embodiment, as shown in FIG. 7, a hammer union pressure transducer 180 is formed with the nose end 182 coupled directly to the connecting end 184. A seal (not shown) may be provided therebetween. In this embodiment, to further prevent disassembly, the nose end and the connecting end are welded together at weld line 186. If disassembly is required, the nose end 182 may be cut from the connecting end 184 at lip area 186. Repairs may then be made and the assembly reattached. It should be understood that though the connecting end is formed with a flat surface 188 and debris egress holes 190, the mounting area may be elevated and a conical surface may be provided as described above in order to minimize accumulation of debris. Also, it should be appreciated that the pressure sensor and related electronics, though shown differently than that of FIG. 4, any suitable arrangement may be used, as the present disclosure is not limited in this regard.

Figure 8:
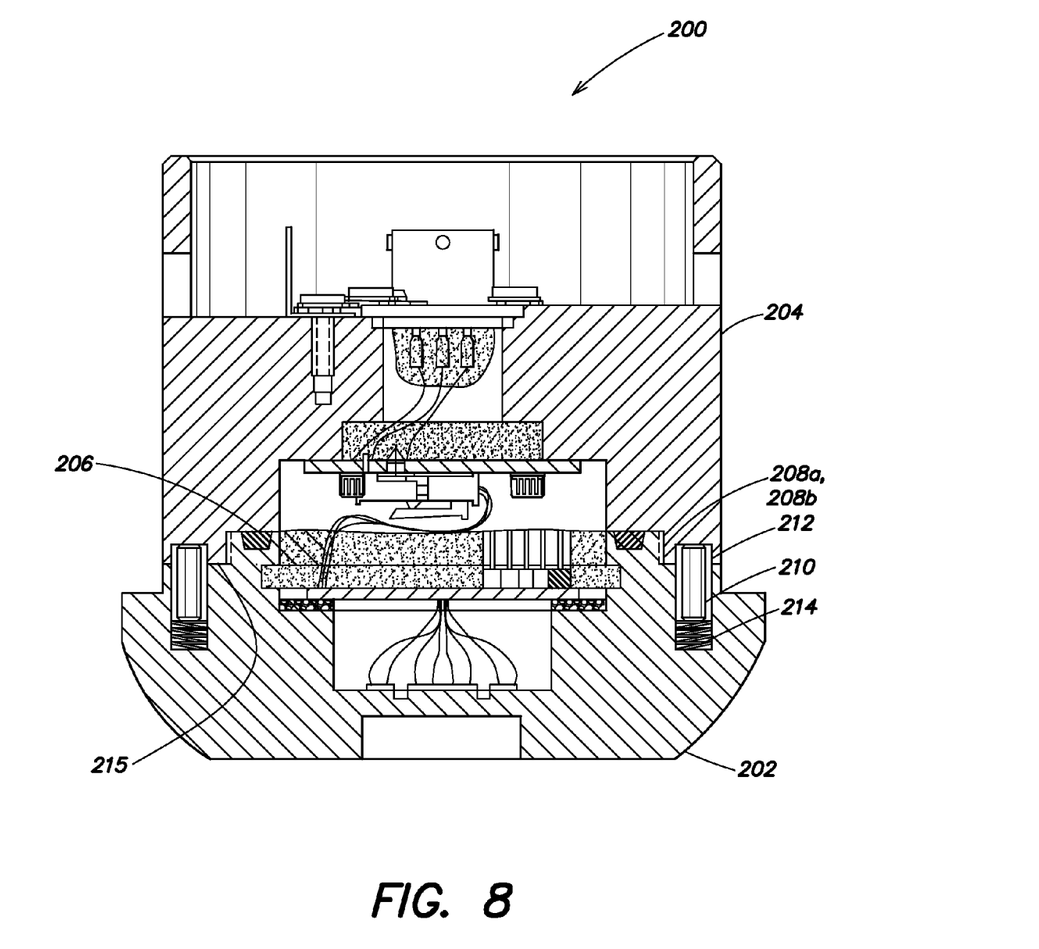
FIG. 8 is a cross-sectional view of another embodiment of a hammer union pressure transducer.

In one embodiment, as shown in FIG. 8, a hammer union pressure transducer 200 is formed with nose end 202 coupled directly to the connecting end 204. A seal 206 may be provided therebetween. In this embodiment, as with the embodiment described above with reference in particular to FIG. 4, the nose end 202 is formed with male threads 208*a* and the connecting end is formed with female threads 208*b*, though the pressure sensing end may be formed with female threads and the connecting end may be formed with male threads, as the present disclosure is not limited in this regard. A thread locking adhesive may be applied to the threads 208*a*, 208*b* to aid in preventing disassembly. In this embodiment, to further prevent disassembly, the pressure sensing end and the connecting end are coupled by one or more spring-loaded pin(s) 210 engageable within corresponding hole(s) 212. Pins 210 are biased with springs 214. As the nose end 202 is threaded into connecting end 204, the pins engage the facing surface 214 of the connecting end until the nose end is threaded/rotated a sufficient amount whereupon the pin finds the hole 212 and us urged into the hole 212. At that point, further rotation is not possible unless the pins themselves are destroyed. This may be possible with the use of shear pins formed of a suitable material (such as nylon, delrin or aluminum) such that upon a predetermined amount of torque applied between the nose end and the connecting end, the pins shear and rotation between the nose end and the connecting end is once again possible. Other suitable anti-rotation locks may be employed, such as a ball plunger, as the present disclosure is not limited in this regard.

In each of the embodiments described with reference to FIGS. 5-8, the nose end is formed as a single monolithic body. However, the disclosure is not to be limiting, as such embodiments may include multiple components forming the nose end, such as the pressure sensing end and adapter ring herein described.

Figure 9:
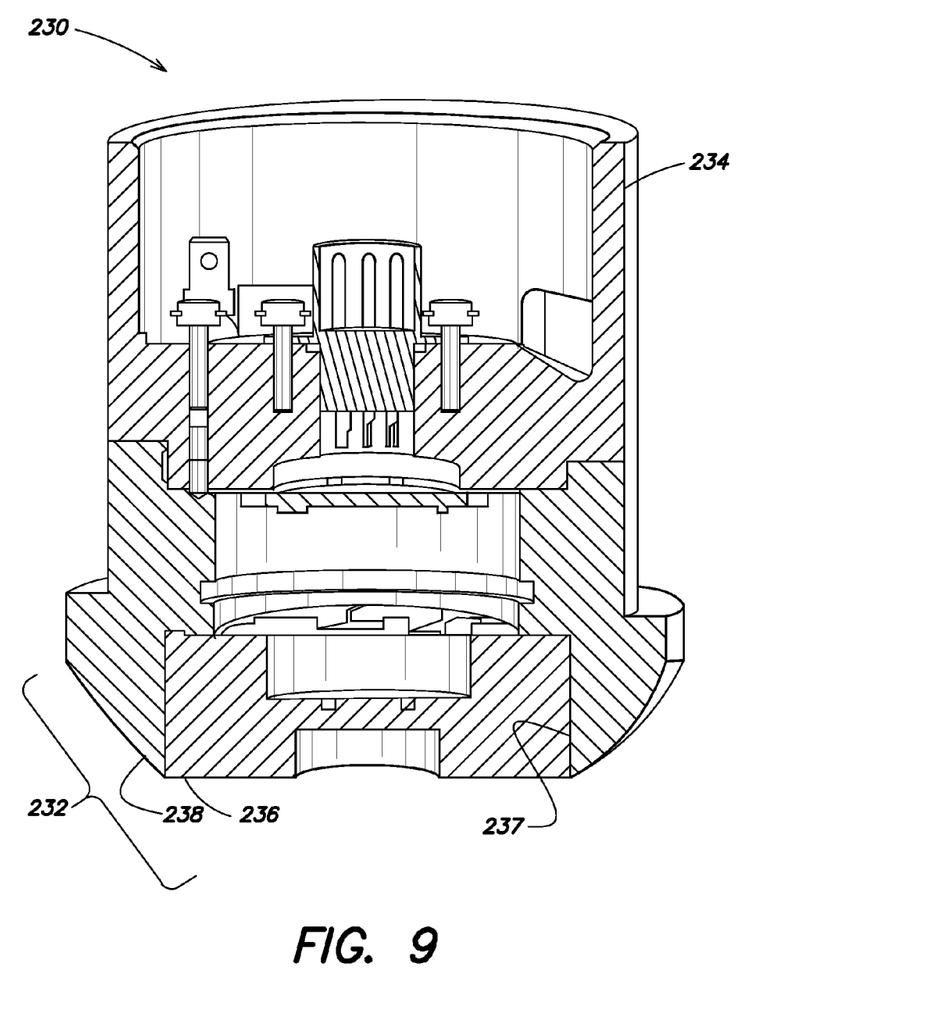
FIG. 9 is a cross-sectional perspective view of another embodiment of a hammer union pressure transducer.

In one embodiment, as shown in FIG. 9, a hammer union pressure transducer 230 is formed with the nose end comprising a pressure sensing end 232 coupled to the adapter ring. The nose end is coupled to the connecting end 234. Any of the above arrangements may be used to connect the two components. In this embodiment, the nose end (and more particularly in this embodiment, the sensing end) includes an insert 236. For example, the sensing end includes an insert recess 237. The insert may be formed of a suitable material such as 718 Inconel® whereas the body 238 of the pressure sensing end 232 is formed of a different material such as stainless steel. In this way, the portion of the sensing end that is in contact with the pressurized fluid may be formed with a compatible material. Oftentimes, such a material can be more costly than a material necessary for the function of the sensing end, such as the function of engaging the male component of the hammer union and engaging with the connecting end. Accordingly, forming the sensing end with a recess to accept a more costly insert may be desirable in some instances. In one embodiment, the insert is press fit into the recess, though any suitable attachment arrangement, such as welding, bonding or threading may be employed as the present disclosure is not limited in this regard.

Figure 10A:
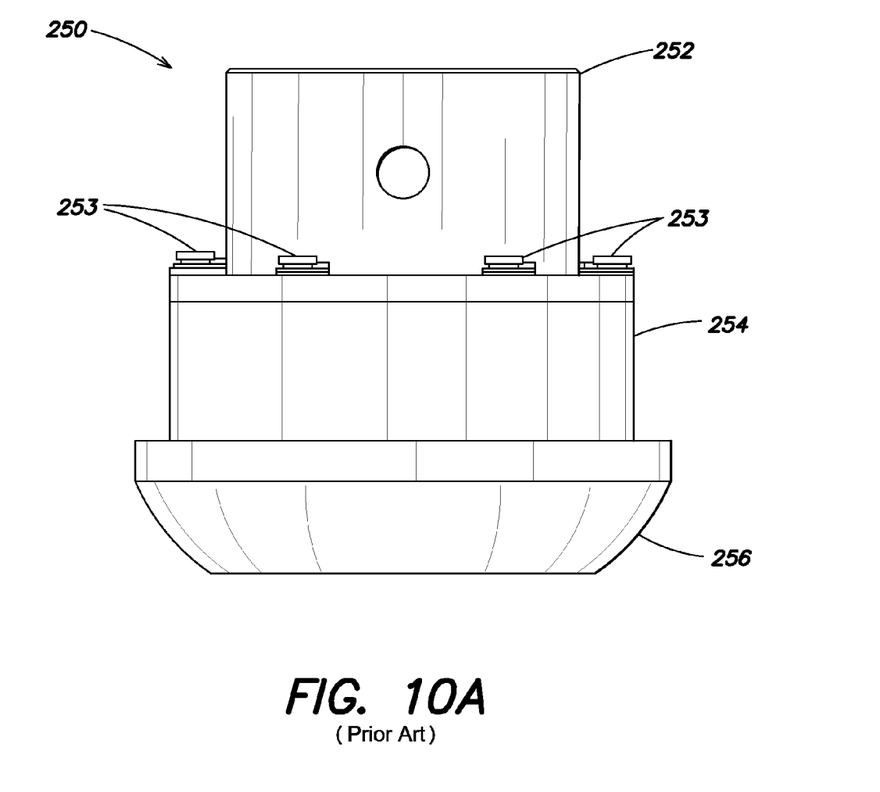
FIG. 10A is a side view of a prior art hammer union pressure transducer.

According to another aspect, a conventional hammer union pressure transducer may be upgraded to include the sloped surface feature and/or the anti-rotation feature described above with reference to FIG. 4. In particular, as shown in FIG. 10A, the prior hammer union pressure transducer 250, such as the Viatran® Model 510, includes a connection end 252 bolted (via bolts 253) on to an adapter ring 254 which itself is welded to the pressure sensing end 256. As can be appreciated, because the pressure sensing end 256 is formed of Inconel®, it may be desirable to reuse the pressure sensing end, yet upgrade the hammer union pressure transducer to include the benefits of debris mitigation and/or prevent disassembly or otherwise reduce disassembly ease.

Figure 10B:
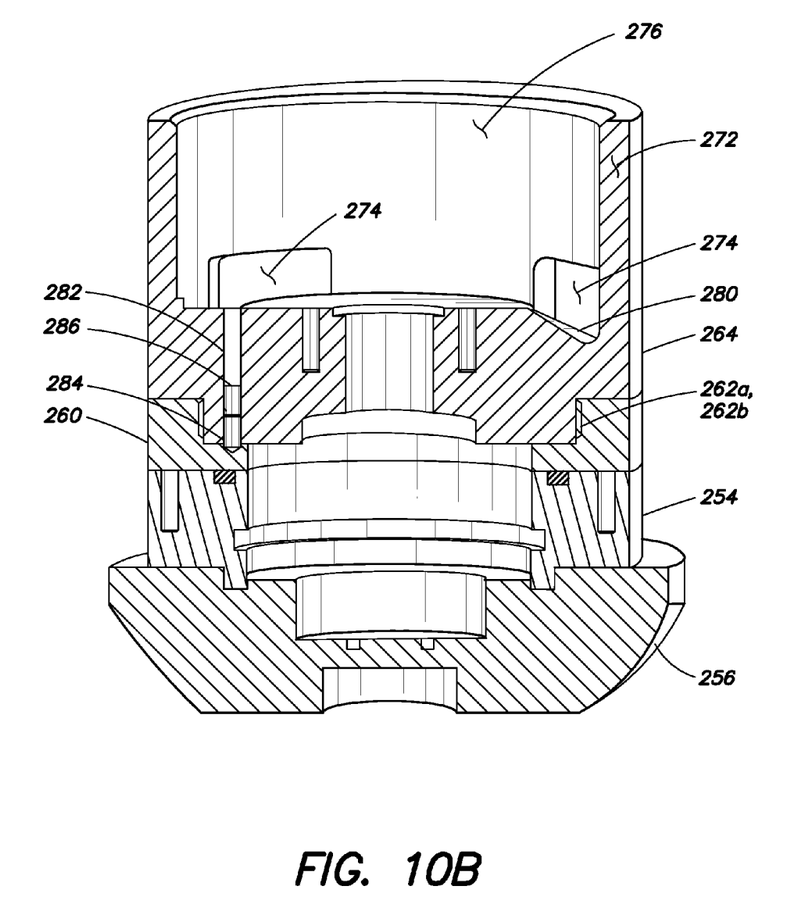
FIG. 10B is a cross-sectional view of another embodiment of a hammer union pressure transducer.
Figure 10C:
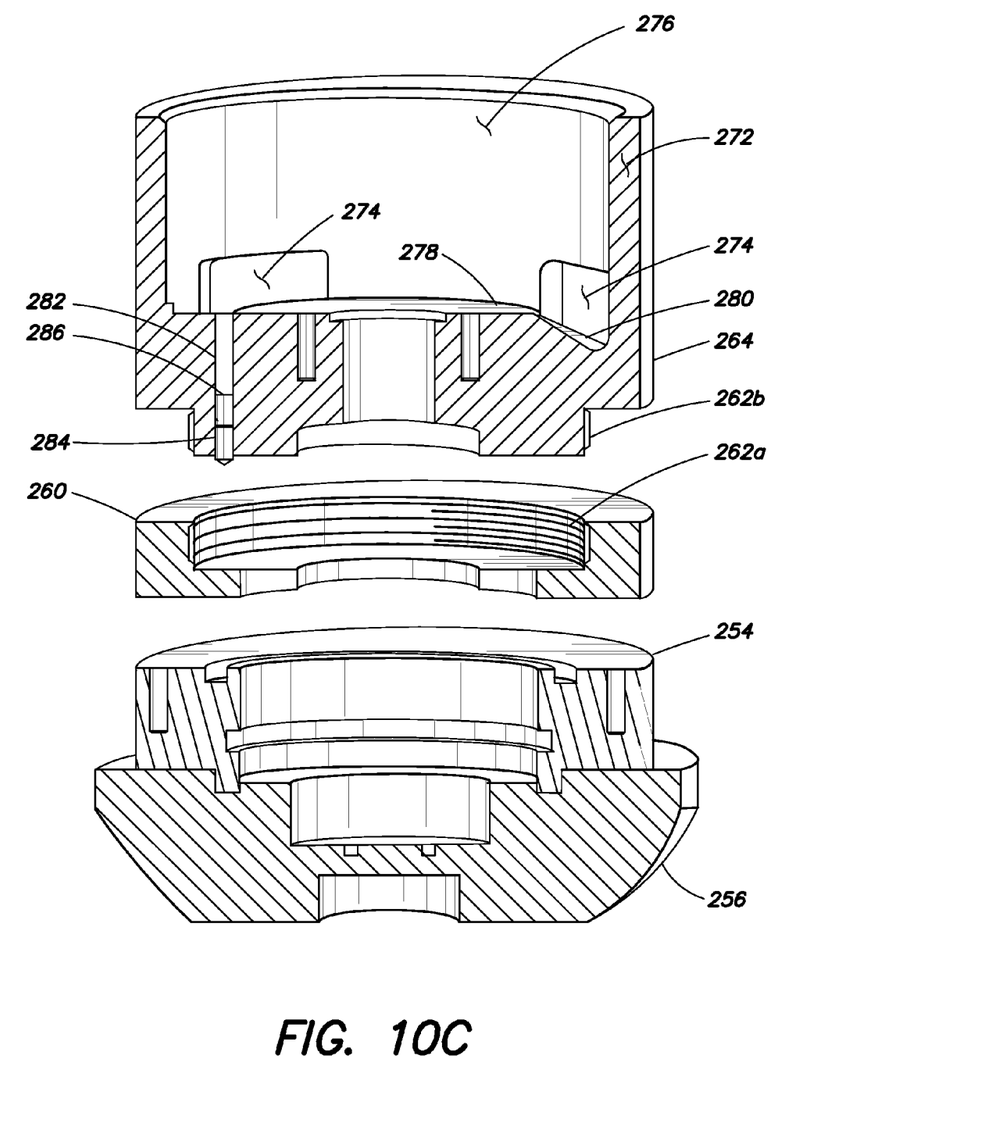
FIG. 10C is an exploded cross-sectional view of the hammer union pressure transducer of FIG. 10B.

Turning to FIGS. 10B and 10C, an upgrade kit will now be described. With the lower portion of the prior hammer union pressure transducer (e.g., the nose end with its pressure sensing end 256 and adapter ring 254) saved for re-use, an adapter plate 260 is welded to the existing adapter ring 254. The adapter plate 260 is formed with female threads 262a to couple with male threads 262b of a new connection end 264. Of course, the adapter plate 260 may be formed with male threads and the connection end 264 may be formed with female threads, as the present disclosure is not limited in this regard. As with the embodiment of FIG. 4, thread locking adhesive may be applied to the threads 262a, 262b to aid in preventing disassembly. An O-ring seal (not shown) may be sandwiched between the connection end 264 and the adapter plate 260, though other suitable seals (or no seal at all) may be employed. It should be appreciate that although a seal groove is not shown in the adapter plate, a suitable sealing groove may be employed, as was shown in the embodiment of FIG. 4.

With the adapter plate attached to the previously existing sensing end and adapter ring, a new connection end 264 may be threaded to the adapter plate. The new connection end side wall 272 includes one or more drainage opening(s) 274. This allows debris such as water, mud, and sludge to flow out of the recess 276 and away from the connection, as described above with reference to FIG. 4. The openings are sized large enough to facilitate such drainage, reducing the likelihood that debris will become lodged in the opening and block flow. The overall height of this retrofitted hammer union pressure transducer is greater than the hammer union pressure transducer of FIG. 4, and in one embodiment is approximately 0.5 inches taller than the hammer union pressure transducer before the upgrade.

To further facilitate such drainage, as with the embodiment of FIG. 4, the bottom of the recess upon which the electrical connection is mounted is sloped toward the drainage holes. This sloped surface 280 forms a flow path away from the connector toward the drainage openings 274 to reduce the accumulation of debris and moisture around the connector. It should also be appreciated, that as with the embodiment of FIG. 4, though the sloped surface is a flat conical surface that extends from the drainage holes toward a raised flat surface 278 of the electrical connection mounting area to which at least a portion of the electrical connection (not shown) is mounted, the present disclosure is not limited in this regard and other suitable sloped surfaces, such as a convex shape or concave shape, may be employed. Further, as with the embodiment of FIG. 4, though the drainage holes are shown as generally rectangular with a length equal to about twice the height of the opening, other suitable shapes, such as round, oval, triangular, square, crescent, etc. may be used. Also, though four equally spaced drainage holes extending around the periphery of the housing, more or less drainage openings (and with or without equal spacing) may be employed, as the present disclosure is not so limited.

To reduce or prevent unscrewing the connection end from the adapter plate, any of the above-described or other anti-rotation features may be employed. In the embodiment shown in FIGS. 10B and 10C, the connection end 264 includes a threaded hole 282 for a screw lockup arrangement. In one embodiment, after the adapter plate (with pressure sensing end 256 and adapter ring 254 thereattached) is threaded to the connection end, a first chisel point set screw 284 is threaded in the threaded hole where the chisel point penetrates into the mating surface of the adapter plate. In one embodiment, to aid in the penetration of the set screw, an indentation tool is first inserted into the threaded bore and pressed to form an indent in the mating surface. After the first set screw is tightened down against the adapter plate, in order to provide additional security to prevent the set screw from backing out, a second set screw 286 is threaded into the hole and tightened against the first set screw, thus effectively locking it in place. This arrangement prevents the locking set screw from backing out, thus preventing unthreading of the adapter ring and the connection end. In one embodiment, a sealant, such as silicone sealant, may be placed behind the second set screw.

As with the embodiment described with respect to FIG. 4, the entire set screw locking arrangement may be hidden from view inside the connection end to prevent unwanted access. Thus, in a further embodiment, a ground lug may be mounted on the connection end. To further limit access to the set screws and/or instead of creating an additional mounting location, the grounding lug may be attached with a grounding lug mounting screw that threads into the threaded bore 282. Of course the present invention is not limited in this regard and no additional mounting screw need be inserted into the threaded bore and the grounding lug, if used, may be attached via some other mounting arrangement. Further, any of the other anti-rotation features described above with reference to FIGS. 5-8 may be employed instead, as this embodiment is not so limited.

It should be appreciated that though not shown or described, the embodiment of FIGS. 10B and 10C will include suitable sensing electronics including the strain gage or other pressure responsive device, the printed circuit board, suitable wire leads and potting material and the electrical connector, such as that described above with reference to FIG. 4.

Other features of a conventional pressure transducer, such as conventional hammer union pressure transducers, may be used in connection with the hammer union pressure transducer discussed herein. Such additional features will be readily apparent to one of skill in the art.

It should be appreciated that the pressure transducer described here may be formed with one or more of the above-described features. The above aspects and features may be employed in any suitable combination as the present disclosure is not limited in this respect. It should also be appreciated that the drawings illustrate various components and features which may be incorporated into various embodiments of the invention. For simplification, some of the drawings may illustrate more than one optional feature or component. However, the invention is not limited to the specific embodiments disclosed in the drawings. It should be recognized that some embodiments may include only a portion of the components illustrated in any one drawing figure, and/or may also encompass embodiments combining components illustrated in multiple different drawing figures.

It should be understood that the foregoing description of various embodiments of the invention are intended merely to be illustrative thereof and that other embodiments, modifications, and equivalents of the invention are within the scope of the invention.

What is claimed is:

1. A hammer union pressure transducer, comprising:
    a housing comprising:
        a nose end having a surface adapted to engage an internal sealing surface of a male component of a hammer union coupling,
        a separate connection end removably threaded to the nose end along a mounting thread axis,
        a shoulder formed on the housing, the shoulder adapted to be engaged by a cinch nut of the hammer union coupling to cinch the housing toward the male component such that the sealing surface of the nose end sealingly engages the internal sealing surface of the male component, and
        an anti-rotation device engaging the connection end and the nose end to inhibit inadvertent unthreading of the connection end from the nose end, wherein the anti-rotation device is constructed and is arranged in the housing to be at least one of removable and shearable thereby allowing unthreading of the connection end from the nose end; and
    a pressure sensor disposed in the nose end.

2. The hammer union pressure transducer according to claim 1, wherein the anti-rotation device comprises at least one screw.

3. The hammer union pressure transducer according to claim 2, wherein the at least one screw comprises a set screw.

4. The hammer union pressure transducer according to claim 3, wherein a further screw is adapted to back the set screw to prevent inadvertent unthreading of the set screw.

5. The hammer union pressure transducer according to claim 1, wherein the connection end includes a recessed cavity at an end opposite the nose end.

6. The hammer union pressure transducer according to claim 5, wherein the recessed cavity includes an electrical connection mounting surface, and wherein the hammer union pressure transducer further comprises an electrical connection mounted on the electrical connection mounting surface, the electrical connection being connected to the pressure sensor.

7. The hammer union pressure transducer according to claim 5, wherein the anti-rotation device comprises at least one set screw disposed in a corresponding at least one threaded bore formed in the recessed cavity.

8. The hammer union pressure transducer according to claim 7, further comprising a grounding screw threaded into the threaded bore, with the grounding screw adapted to connect an electrical ground connection to the housing and with the grounding screw obscuring the set screw from view.

9. The hammer union pressure transducer according to claim 8, wherein a second set screw is threaded in the threaded bore and is adapted to back the set screw to prevent inadvertent unthreading of the set screw.

10. The hammer union pressure transducer according to claim 1, wherein the anti-rotation device comprises at least one shear pin.

11. The hammer union pressure transducer according to claim 10, wherein the at least one shear pin comprises at least one spring loaded shear pin.

12. The hammer union pressure transducer according to claim 1, wherein the anti-rotation device comprises at least one spring loaded pin.

13. The hammer union pressure transducer according to claim 1, wherein the nose end comprises a sensing end and an adapter ring coupled to the sensing end, wherein the adapter ring is threaded to the connecting end.

14. The hammer union pressure transducer according to claim 1, wherein the nose end comprises a sensing end and an adapter ring coupled to the sensing end, wherein the hammer union pressure transducer further comprises an adapter plate coupled to the adapter ring, wherein the adapter plate is threaded to the connecting end.

15. The hammer union pressure transducer according to claim 1, further comprising a seal between the connecting end and the nose end.

16. The hammer union pressure transducer according to claim 1, wherein the nose end comprises an insert recess and wherein an insert formed of a material that is different from a material of the nose end is disposed in the insert recess.

17. The hammer union pressure transducer according to claim 16, wherein the insert is formed of a nickel-chromium alloy.

18. The hammer union pressure transducer according to claim 16, wherein the insert is press fit into the insert recess.

19. The hammer union pressure transducer according to claim 6, wherein the connection end includes at least one drain opening in a side wall extending between the recessed cavity and an outside surface of the side wall.

20. The hammer union pressure transducer according to claim 19, wherein the recessed cavity includes a sloping surface extending from the at least one drain opening to the electrical connection mounting surface, the sloped surface adapted to aid with drainage toward the at least one drain opening.

21. The hammer union pressure transducer according to claim 9, wherein the recessed cavity includes an electrical connection mounting surface, and wherein the hammer union pressure transducer further comprises an electrical connection mounted on the electrical connection mounting surface, the electrical connection being connected to the pressure sensor.

22. The hammer union pressure transducer according to claim 21, wherein the connection end includes at least one drain opening in a side wall extending between the recessed cavity and an outside surface of the connecting end.

23. The hammer union pressure transducer according to claim 22, wherein the recessed cavity includes a sloping surface extending from the at least one drain opening to the electrical connection mounting surface, the sloped surface adapted to aid with drainage toward the at least one drain opening.

24. An upgrade kit for a hammer union pressure transducer, the kit comprising:
an adapter plate adapted to connect to a nose end of the hammer union pressure transducer, the nose end having a surface adapted to engage an internal sealing surface of a male component of a hammer union coupling, with the nose end having a shoulder adapted to be engaged by a cinch nut of the hammer union coupling to cinch the housing toward the male component such that the sealing surface of the nose end sealingly engages the internal sealing surface of the male component, and with a pressure sensor disposed in the nose end; and
a connection end removably threaded to the adapter plate along a mounting thread axis.

25. The upgrade kit according to claim 24, wherein the adapter plate is adapted to be welded to the nose end.

26. The upgrade kit according to claim 24, wherein the nose end comprises a sensing end and an adapter ring coupled to the sensing end, with the adapter plate adapted to couple to the adapter ring.

27. The upgrade kit according to claim 24, further comprising an anti-rotation device engaging the connection end and the adapter plate to inhibit inadvertent unthreading of the connection end from the adapter plate, wherein the anti-rotation device is constructed and is arranged to be at least one of removable and shearable thereby allowing unthreading of the connection end from the nose end.

28. The upgrade kit according to claim 24, wherein the connection end includes a recessed cavity at an end opposite the adapter plate.

29. The upgrade kit according to claim 28, wherein the connection end includes at least one drain opening in a side wall extending between the recessed cavity and an outside surface of the side wall.

30. The upgrade kit according to claim 29, wherein the recessed cavity includes a sloping surface extending from the at least one drain opening to the electrical connection mounting surface, the sloped surface adapted to aid with drainage toward the at least one drain opening.

31. The upgrade kit according to claim 28, wherein the set screw is disposed in a threaded bore disposed in the recessed cavity.

32. The upgrade kit according to claim 31, further comprising a grounding screw threaded into the threaded bore, with the grounding screw adapted to connect an electrical ground connection to the housing and with the grounding screw obscuring the set screw from view.

33. The upgrade kit according to claim 32, wherein a second set screw is threaded in the threaded bore and is adapted to back the set screw to prevent inadvertent unthreading of the set screw.

34. The upgrade kit according to claim 33, wherein the recessed cavity includes an electrical connection mounting surface, and wherein the upgrade kit further comprises an electrical connection mounted on the electrical connection mounting surface, the electrical connection being connectable to the pressure sensor.

35. The upgrade kit according to claim 34, wherein the connection end includes at least one drain opening in a side wall extending between the recessed cavity and an outside surface of the connecting end.

36. The upgrade kit according to claim 35, wherein the recessed cavity includes a sloping surface extending from the at least one drain opening to the electrical connection mounting surface, the sloped surface adapted to aid with drainage toward the at least one drain opening.

37. A hammer union pressure transducer adapted to be engaged by a cinch nut of a hammer union coupling to cinch the hammer union pressure transducer toward a male component of the hammer union coupling, the hammer union pressure transducer comprising:
a nose end comprising:
a body,
a pressure sensor disposed in the body,
an external sealing surface adapted to engage an internal sealing surface of the male component of a hammer union coupling,
an insert recess formed into the external sealing surface, and
an insert disposed in the insert recess, the insert being formed of a material that is different from a material of the body; and
a separate connection end removably threaded to the nose end along a mounting thread axis.

38. The hammer union pressure transducer according to claim 37, wherein the insert is formed of a nickel-chromium alloy.

39. The hammer union pressure transducer according to claim 38, wherein the body is formed of stainless steel.

40. The hammer union pressure transducer according to claim 37, wherein the insert is press fit into the insert recess.

41. The hammer union pressure transducer according to claim 37, wherein the connection end includes a recessed cavity at an end opposite the nose end.

42. The hammer union pressure transducer according to claim 41, wherein the connection end includes at least one drain opening in a side wall extending between the recessed cavity and an outside surface of the side wall.

43. The hammer union pressure transducer according to claim 42, wherein the recessed cavity includes a sloping surface extending from the at least one drain opening to the electrical connection mounting surface, the sloped surface adapted to aid with drainage toward the at least one drain opening.

* * * * *